US012080252B2

(12) United States Patent
He

(10) Patent No.: US 12,080,252 B2
(45) Date of Patent: Sep. 3, 2024

(54) DRIVING METHOD OF DISPLAY PANEL, DISPLAY PANEL, AND DISPLAY DEVICE CAPABLE OF IMPROVING COLOR SHIFT PROBLEM

(71) Applicant: TCL CHINA STAR OPTOELECTRONICS TECHNOLOGY CO., LTD., Guangdong (CN)

(72) Inventor: Jhenwei He, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/594,049

(22) PCT Filed: Jul. 27, 2021

(86) PCT No.: PCT/CN2021/108578
§ 371 (c)(1),
(2) Date: Sep. 30, 2021

(87) PCT Pub. No.: WO2023/284006
PCT Pub. Date: Jan. 19, 2023

(65) Prior Publication Data

US 2024/0046895 A1 Feb. 8, 2024

(30) Foreign Application Priority Data

Jul. 13, 2021 (CN) ......................... 202110789581.1

(51) Int. Cl.
*G09G 3/30* (2006.01)
*G09G 3/36* (2006.01)

(52) U.S. Cl.
CPC ......... *G09G 3/3607* (2013.01); *G09G 3/3611* (2013.01); *G09G 2310/08* (2013.01); *G09G 2320/0242* (2013.01); *G09G 2320/0247* (2013.01)

(58) Field of Classification Search
CPC ............... G09G 3/3607; G09G 3/3611; G09G 2320/0247
See application file for complete search history.

(56) References Cited

U.S. PATENT DOCUMENTS

2006/0119627 A1* 6/2006 Yamada ............... G09G 3/2066 345/694
2013/0278585 A1* 10/2013 Moon ................. G09G 3/3648 345/212
2013/0321483 A1* 12/2013 You ................... G02F 1/134336 345/690
2015/0325165 A1* 11/2015 Mori .................... G09G 3/2081 345/698

* cited by examiner

*Primary Examiner* — Sanghyuk Park

(57) ABSTRACT

A driving method of a display panel, a display panel, and a display device are provided. Pixel units are grouped, so that the pixel units include the same number of sub-pixels. Each of the pixel units performs a display grayscale switching in a corresponding switching frame. A number of the sub-pixels having a first display gray level and a number of the sub-pixels having a second display gray level in each of the pixel units are the same. A the frame time of maintaining the first display grayscale by each of the pixel units and a frame time of maintaining the second display grayscale by each of the pixel units are the same.

15 Claims, 5 Drawing Sheets

DRIVING METHOD OF DISPLAY PANEL, DISPLAY PANEL, AND DISPLAY DEVICE CAPABLE OF IMPROVING COLOR SHIFT PROBLEM

TECHNICAL FIELD

The present disclosure relates to the display technology field, and more particularly to a driving method of a display panel, a display panel, and a display device.

BACKGROUND ART

In a display panel with a high resolution, a 4-domain pixel structure is often used in conjunction with a time-domain viewing angle compensation algorithm to improve a problem of viewing angle color shift. However, existing liquid crystals have a longer response time, and it is necessary to extend a switching time of HL (an original pixel grayscale value is replaced by two grayscales including a relatively high (H) grayscale and a relatively low (L) grayscale) to achieve effect of improving the viewing angle color shift. However, extending the switching time of HL causes a brightness switching frequency generated during the HL switching to be lower, and thus it is easy to make the human eye feel existence of flicker phenomenon.

Technical Problem

An objective of the present disclosure is to provide a driving method of a display panel, a display panel, and a display device for improving the technical problem that the flicker phenomenon easily occurs in a display panel because display grayscale switching time is extended.

Technical Solution

The present disclosure provides a driving method of a display panel. The display panel includes at least one pixel unit group. The at least one pixel unit group includes a plurality of pixel units. The pixel units include the same number of sub-pixels. The driving method includes steps of: performing a display grayscale switching on each of the pixel units in a corresponding switching frame, wherein in the same frame, a number of sub-pixels having a first display grayscale and a number of sub-pixels having a second display grayscale included in each of the pixel units are the same, and a frame time for which the sub-pixels of the pixel units maintain the first grayscale and a frame time for which the sub-pixels of the pixel units maintain the second grayscale are the same.

Switching frames corresponding to the pixel units are all different. A value of the first display grayscale is greater than a value of the second display grayscale. The display gray level switching represents that the first display grayscale which the sub-pixels have is switched to the second display grayscale, and the second display grayscale which the sub-pixels have is switched to the first display grayscale.

The present disclosure further provides a display panel. The display panel includes at least one pixel unit group and a control module. The at least one pixel unit group includes a plurality of pixel units. The pixel units include the same number of sub-pixels. The control module is configured to: obtain, according to input image data, a first display grayscale and a second display gray level corresponding to an original pixel grayscale of each of the sub-pixels; perform a display grayscale switching for each of the pixel units in a corresponding switching frame, so that in the corresponding switching frame, the first display grayscale which the sub-pixels have is switched to the second display grayscale and the second display grayscale which the sub-pixels have is switched to the first display grayscale; and to control the sub-pixels in the pixel units to have the same frame time of maintaining the first display grayscale and the second display grayscale.

Switching frames corresponding to the pixel units are all different. A value of the first display grayscale is greater than a value of the second display grayscale. The display gray level switching represents that the first display grayscale which the sub-pixels have is switched to the second display grayscale, and the second display grayscale which the sub-pixels have is switched to the first display grayscale.

The present disclosure further provides a display device. The display device includes any one the above-mentioned display panels or a display panel driven by any one of the above-mentioned driving methods.

Advantageous Effects

In the driving method of the display panel, the display panel, and the display device provided by the present disclosure, the pixel units included in the display panel are grouped, so that the pixel units include the same number of sub-pixels. Each of the pixel units performs the display grayscale switching in the corresponding switching frame, so that in each of the pixel units, the first display gray level which the sub-pixels originally have is switched to the second display gray level, and the second display gray level which the sub-pixels originally have is switched to the first display gray level. In the same frame, the number of the sub-pixels having the first display gray level and the number of the sub-pixels having the second display gray level in each of the pixel units are the same. After each of the pixel units performs the display grayscale switching in the corresponding switching frame, the frame time of maintaining the first display grayscale by each of the pixel units and the frame time of maintaining the second display grayscale by each of the pixel units are the same. As such, a brightness switching frequency of the display panel is increased without increasing a refresh frequency of the display panel, thereby reducing a brightness variation range of the display panel. The problem that flicker easily occurs in the display panel because a display grayscale switching time is extended can be improved, while the color shift problem of the display panel is improved.

DETAILED DESCRIPTION OF EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure but are not intended to limit the present disclosure.

Figure 1:
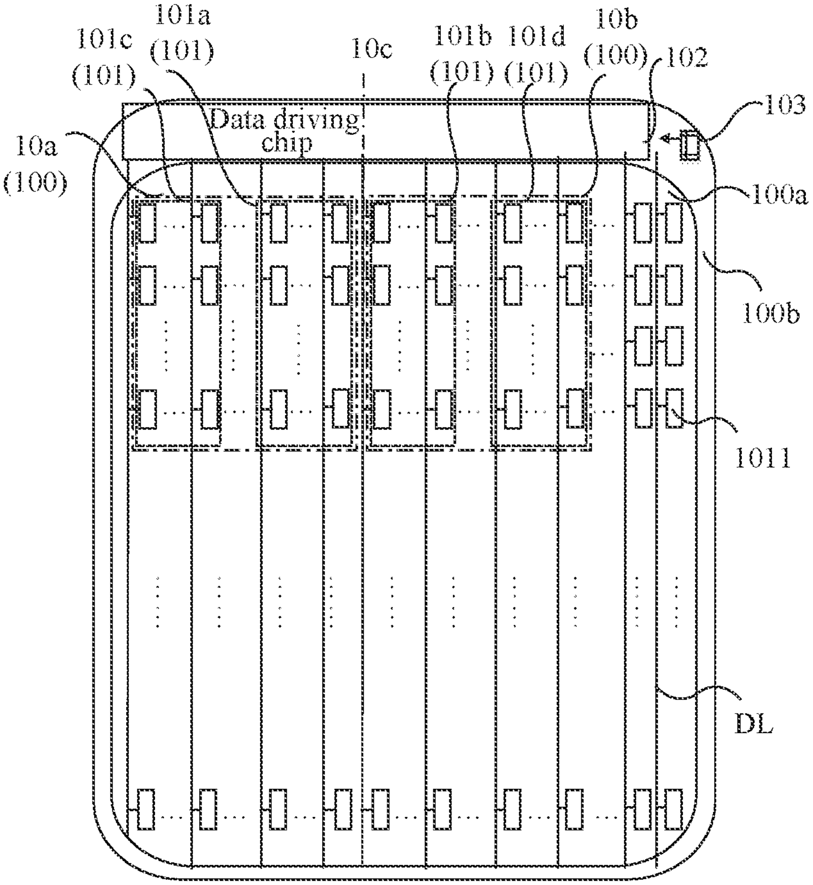
FIG. 1 illustrates a structural diagram of a display panel provided by an embodiment of the present disclosure.

Specifically, FIG. 1 illustrates a structural diagram of a display panel provided by an embodiment of the present disclosure. The display panel includes a display area 100*a* and a non-display area 100*b*. The non-display area 100*b* is located at a periphery of the display area 100*a*. The display area 100*a* has a display function, and the non-display area 100*b* does not have a display function. Optionally, the display panel further includes a sensing area. The display panel includes a sensor disposed corresponding to the sensing area. The display area 100*a* can be located at a periphery of the sensing area, so that the sensing area is only connected to the display area 100*a*. Alternatively, the sensing area is located between the display area 100*a* and the non-display area 100*b*, so that the sensing area is connected to the display area 100*a* and the non-display area 100*b*, respectively. Optionally, the sensing area may have a display function or may not have a display function. The sensor includes a camera, a fingerprint sensor, a distance sensor, and so on.

The display panel includes a pixel unit group 100 located in the display area 100*a*. The pixel unit group 100 includes a plurality of pixel units 101. Each of the pixel units 101 includes a plurality of sub-pixels 1011. The pixel units 101 have the same number of the sub-pixels 1011.

Optionally, light-emitting colors of the sub-pixels 1011 are different. Further, the light-emitting colors of the sub-pixels 1011 include a red color, a blue color, a green color, a white color, a yellow color and so on. Optionally, an arrangement structure of the sub-pixels 1011 is not limited to a standard RGB arrangement, a Pentile arrangement, a Delta arrangement, a diamond arrangement and so on.

Further, the display panel further includes a data driving chip 102. The data driving chip 102 is located in the non-display area 100*b*. The data driving chip 102 is electrically connected to the sub-pixels 1011 through a plurality of data lines DL for providing grayscale voltages for display to the sub-pixels 1011.

Optionally, the display panel is a passive light-emitting display panel. Further, the display panel includes a liquid crystal display panel.

Specifically, the display panel includes an array substrate, a color filter substrate, pixel electrodes, a common electrode, and a sealant and liquid crystal molecules located between the array substrate and the color filter substrate. The array substrate includes a plurality of pixel driving circuits. The pixel driving circuits are electrically connected to the sub-pixels 1011, so that the sub-pixels 1011 can realize a display function based on the grayscale voltages received by the corresponding pixel driving circuits. Each of the sub-pixels 1011 includes one of the pixel electrodes and the liquid crystal molecules. Optionally, the pixel electrodes and the common electrode can be both located on the array substrate. Alternatively, the pixel electrodes are located on the array substrate, and the common electrode is located on the color filter substrate. A pixel structure of the display panel is not limited to a 4-domain, an 8-domain or other forms. It can be understood that the display panel further includes an alignment layer, a polarizer, a touch electrode, and other parts which are not shown.

Figure 2A:
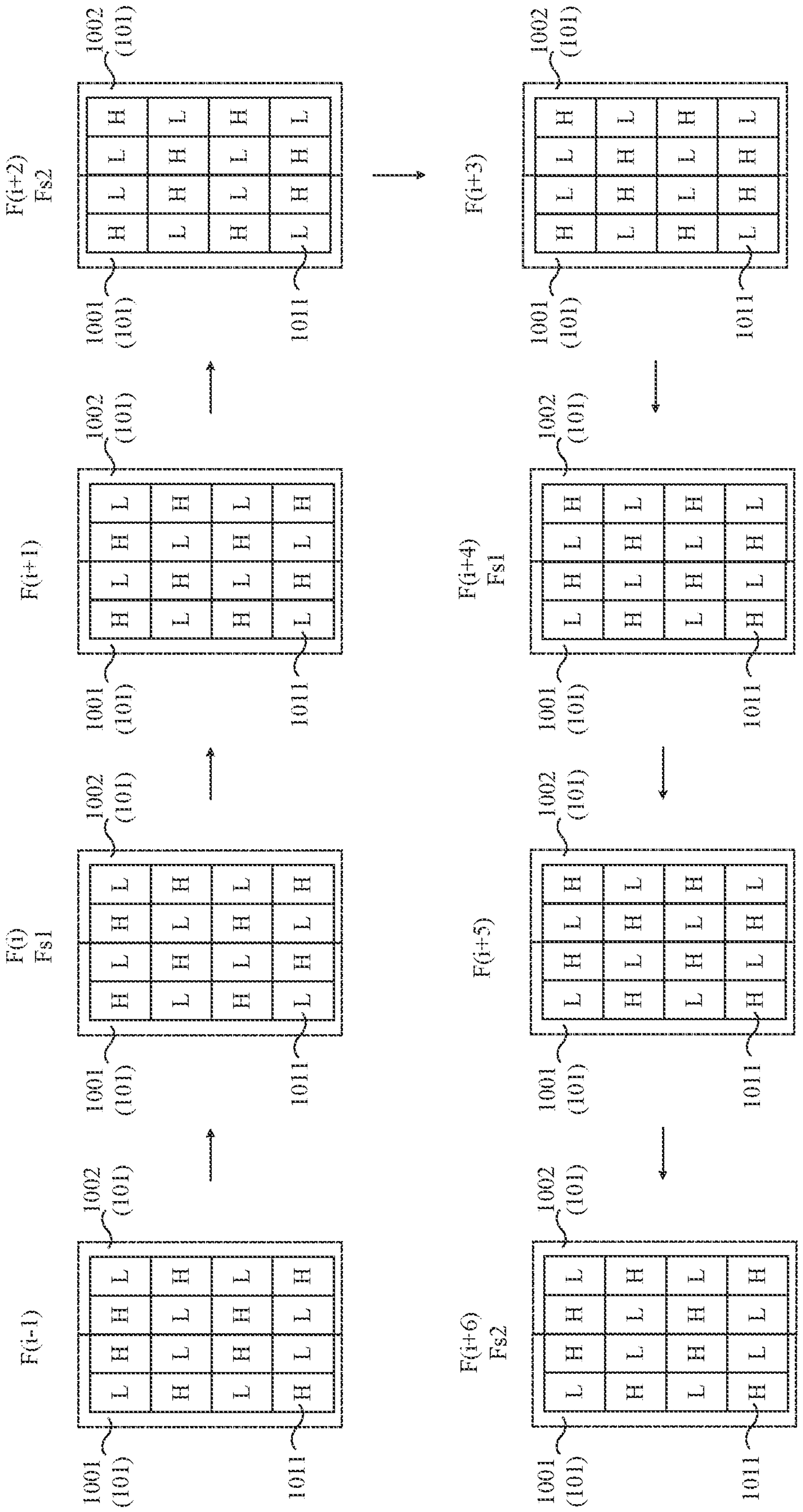
FIGS. 2A-2C illustrate structures of the pixel unit groups provided by embodiments of the present disclosure.
Figure 2B:
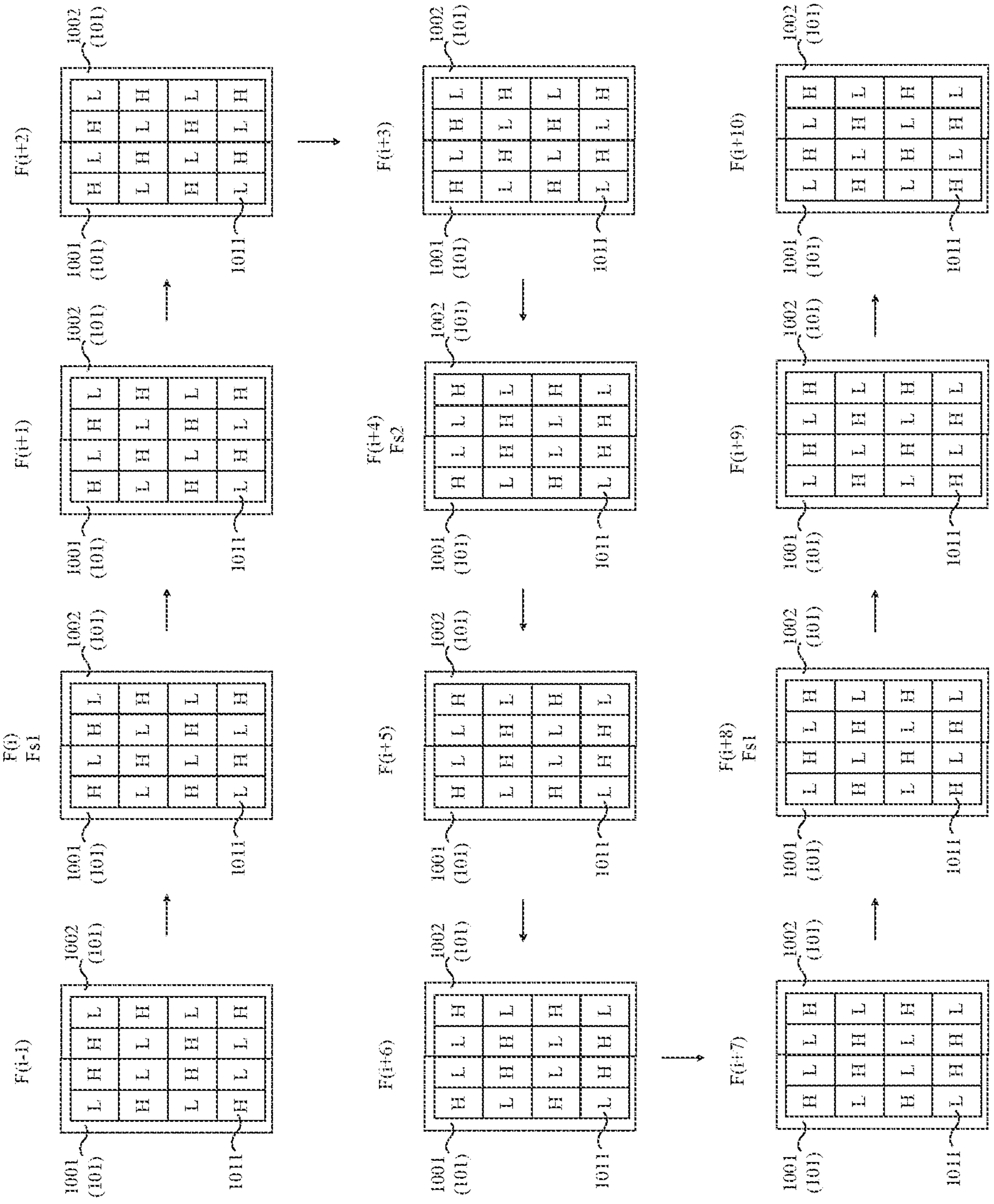
Figure 2C:
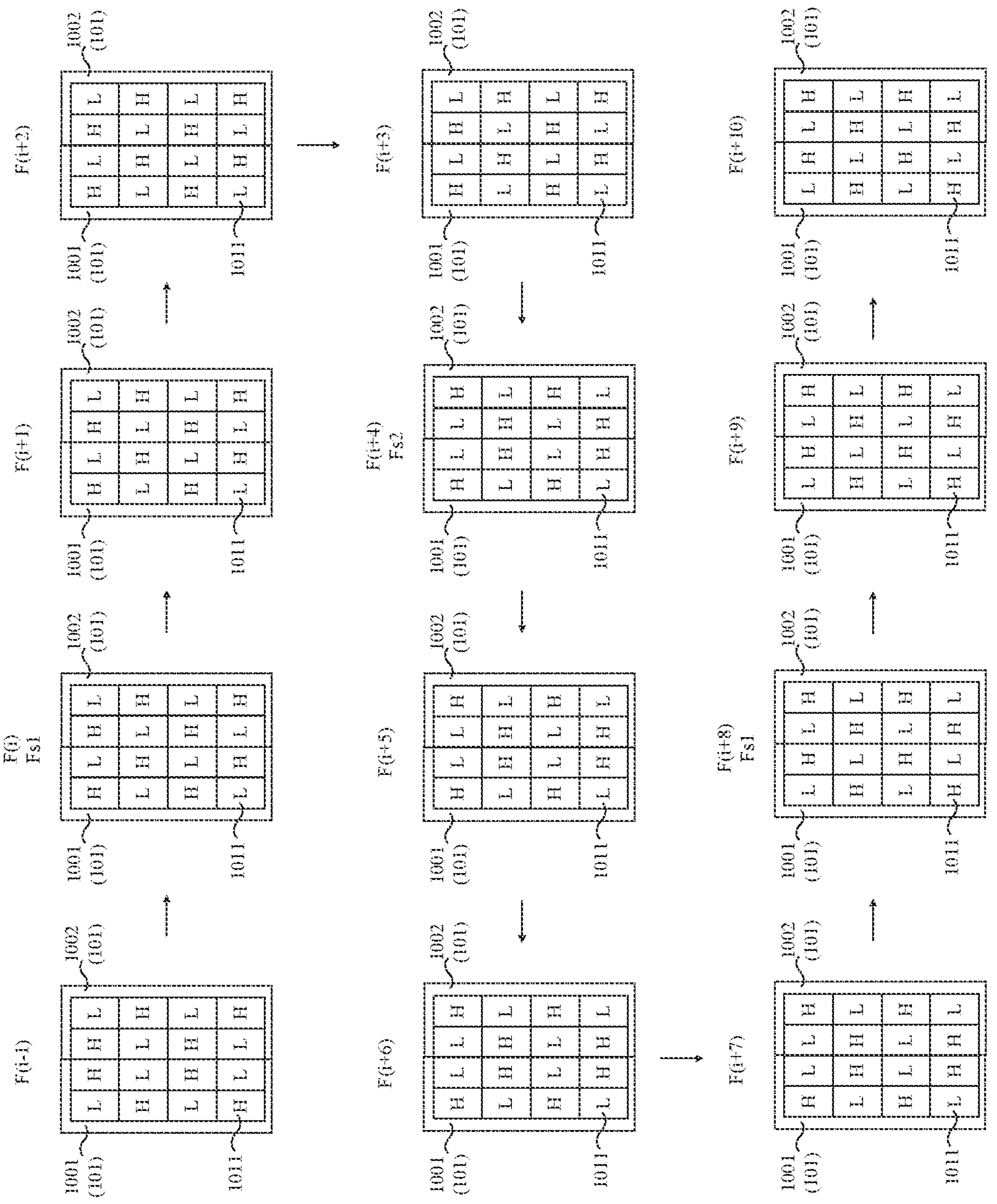

FIGS. 2A to 2C illustrate structures of the pixel unit groups provided by embodiments of the present disclosure. Please continue to refer to FIG. 1 and FIGS. 2A-2C. The present disclosure provides a driving method of a display panel. The driving method includes the following steps. A display grayscale switching is performed on each of the pixel units 101 in a corresponding switching frame Fs. In the same frame, a number of sub-pixels having a first display grayscale H and a number of sub-pixels having a second display grayscale L included in each of the pixel units 101 are the same. A frame time Fh for which the sub-pixels 1011 of the pixel units 101 maintain the first grayscale H and a frame time Fh for which the sub-pixels 1011 of the pixel units 101 maintain the second grayscale L are the same.

The switching frames Fs corresponding to the pixel units 101 are all different. A value of the first display grayscale H is greater than a value of the second display grayscale L. The display gray level switching represents that the first display grayscale H which the sub-pixels originally have is switched to the second display grayscale L, and the second display grayscale L which the sub-pixels originally have is switched to the first display grayscale H. Performing the display gray level switching on each of the pixel units 101 in the corresponding switching frame Fs represents that in each of the pixel units 101 in the corresponding switching frame Fs, the first display grayscale H which the sub-pixels originally have is switched to the second display grayscale L, and the second display grayscale L which the sub-pixels originally have is switched to the first display grayscale H.

That is, in the driving method of the display panel, a first one of the pixel units 101 which performs the display grayscale switching enters a stage of maintaining the first display grayscale H and the second display grayscale L after completing the display grayscale switching. When the first one of the pixel units 101 which performs the display grayscale switching enters the stage of maintaining the first display grayscale H and the second display grayscale L, the remaining pixel units 101 sequentially perform the display grayscale switching and then sequentially enter stages of maintaining the first display grayscale H and the second display grayscale L. After each of the pixel units 101 completes the display gray level switching, the number of the sub-pixels having the first display gray level H and the number of the sub-pixels having the second display gray level L in each of the pixel units 101 are the same. The pixel units 101 include the same number of the sub-pixels having the first display gray level H, and the pixel units 101 include the same number of sub-pixels having the second display gray level L. A frame time of entering the stage of maintaining the first display grayscale H by each of the pixel units 101 and a frame time of entering the stage of maintaining the second display grayscale L by each of the pixel units 101 are the same.

The pixel units 101 included in the display panel are grouped, so that the pixel units 101 include the same number of sub-pixels 1011. Each of the pixel units 101 performs the display grayscale switching in the corresponding switching frame Fs, so that in each of the pixel units 101, the first display gray level H which the sub-pixels originally have is switched to the second display gray level L, and the second display gray level L which the sub-pixels originally have is switched to the first display gray level H. In the same frame, the number of the sub-pixels having the first display gray level H and the number of the sub-pixels having the second display gray level L in each of the pixel units 101 are the same. After each of the pixel units 101 performs the display grayscale switching in the corresponding switching frame Fs, the frame time Fh of maintaining the first display grayscale H by each of the pixel units 101 and the frame time of maintaining the second display grayscale L by each of the pixel units 101 are the same. As such, a brightness switching frequency of the display panel is increased without increasing a refresh frequency F0 of the display panel, thereby reducing a brightness variation range of the display panel. The problem that flicker easily occurs in the display panel because a display grayscale switching time is extended can be improved, while the color shift problem of the display panel is improved. After each display grayscale switching is performed, positions of the sub-pixels having the first display grayscale H and the sub-pixels having the second display grayscale are changed, which is beneficial for increasing fineness of an image displayed by the display panel and improving graininess of the image displayed by the display panel.

Further, differences Fd of frame numbers corresponding to two adjacent ones of the pixel units are the same when the sub-pixels 1011 in the two adjacent ones of the pixel units 101 perform the display grayscale switching. Accordingly, the pixel units 101 perform the display grayscale switching in the same frame numbers to realize uniform of the brightness variation of the display panel. It can be understood that each of the differences Fd of frame numbers corresponding to two adjacent ones of the pixel units, when the sub-pixels 1011 in the two adjacent ones of the pixel units 101 perform the display grayscale switching, is a difference of the switching frames Fs corresponding to the two adjacent ones of the pixel units 101.

Further, in order to reduce the sensitivity of the human eye to a brightness variation process of the display panel in response to the pixel units 101 performing the display grayscale switching, each of the differences Fd of the switching frames Fs corresponding to two adjacent ones of the pixel units 101 is smaller than or equal to a ratio of the refresh frequency F0 of the display panel to a critical flicker frequency CFF, that is, $Fd \le F0/CFF$.

Optionally, the refresh frequency F0 of the display panel is greater than or equal to 100 Hz. The critical flicker frequency CFF is greater than or equal to 50 Hz. Further, the refresh frequency F0 of the display panel is equal to 100 Hz, 120 Hz, 240 Hz, 360 Hz, or 480 Hz. The critical flicker frequency CFF is equal to 50 Hz or 60 Hz.

Further, when the frame time of the first one of the pixel units 101 which performs the display gray level switching and then enters the stage of maintaining the first display grayscale H and the second display grayscale after completing the display gray level switching is greater than the refresh frequency F0, a cyclic period of completing the display grayscale switching by the pixel units 101 is also greater than the refresh frequency F0 of the display panel. This is not beneficial for increasing the brightness switching frequency of the display panel. Therefore, in order to control the pixel units 101 of the pixel unit group 100 to realize, under a situation that the refresh frequency F0 of the display panel is unchanged, the cyclic period of the display grayscale switching to increase the brightness switching frequency of the display panel, the frame time Fh of maintaining the first display grayscale H and the frame time Fh of maintaining the second display grayscale L in the sub-pixels 1011 of each of the pixel units 101 are equal to a product of a number N of the pixel units 101 included in the pixel unit group 100 and the difference Fd of the switching frames Fs corresponding to two adjacent ones of the pixel units 101, that is, $Fh=N*Fd$.

For ease of understanding, an example where the display panel includes a pixel unit group 100, the pixel unit group 100 includes two pixel units 101 (that is, N=2), and each of the pixel units 101 includes M sub-pixels 1011 is used for explaining and describing the driving method of the display panel. Specifically, please continue to refer to FIGS. 2A to 2B. The pixel unit group 100 includes a first pixel unit 1001 and a second pixel unit 1002 which are adjacent to each other. Each of the first pixel unit 1001 and the second pixel unit 1002 includes M=8 sub-pixels 1011.

When the refresh frequency F0 of the display panel is equal to 120 Hz and the critical flicker frequency CFF is equal to 60 Hz, the first pixel unit 1001 performs a display grayscale switching in a switching frame Fs1, and the second pixel unit 1002 performs a display grayscale switching in a switching frame Fs2. A difference Fd of the switching frame Fs2 corresponding to the second pixel unit 1002 performing the display grayscale switching and the switching frame Fs1 corresponding to the first pixel unit 1001 performing the display grayscale switching is smaller than or equal to a ratio of the refresh frequency F0 of the display panel to the critical flicker frequency CFF, that is, $Fs2-Fs1=Fd \le 2$. A frame time Fh of maintaining the first display grayscale H in the sub-pixels 1011 of each of the first pixel unit 1001 and a frame time Fh of maintaining the second display grayscale L in the sub-pixels 1011 of each of the second pixel unit 1002 are equal to $N*Fd=2*Fd$.

Further, it is assumed that Fd is equal 2 and Fh is equal to 4. That is, the first pixel unit 1001 performs the display gray-scale switching in an i-th frame F(i), and the second pixel unit 1002 performs the display grayscale switching in an (i+2)-th frame F(i+2). That is, at this time, the switching frame Fs1 corresponding to the first pixel unit 1001 is F(i), and the switching frame Fs2 corresponding to the second pixel unit 1002 is F(i+2). The switching frame Fs1 corresponding to the first pixel unit 1001 and the switching frame Fs2 corresponding to the second pixel unit 1002 satisfy $Fd=Fs2-Fs1$. The first pixel unit 1001 and the second pixel unit 1002 perform the display grayscale switching every other frame (i.e., perform the display grayscale switching before and after the (i+1)-th frame F(i+1)). Then, the first pixel unit 1001 performs the display grayscale switching again in an (i+4)-th frame F(i+4), and the second pixel unit 1002 performs the display grayscale switching in an (i+6)-th frame F(i+6). That is, at this time, the switching frame Fs1 corresponding to the first pixel unit 1001 is F(i+4), and the switching frame Fs2 corresponding to the second pixel unit 1002 is F(i+6). A cycle is sequentially performed. In each frame, a number of the sub-pixels 1011 having the first display gray level H in the first pixel unit 1001 is M/2, and a number of the sub-pixels 1011 having the second display gray level L in the first pixel unit 1001 is M/2. In each frame, a number of the sub-pixels 1011 having the first display gray level H in the second pixel unit 1002 is M/2, and a number of the sub-pixels 1011 having the second display gray level L in the second pixel unit 1002 is M/2. From beginning of the i-th frame F(i) to ending of the (i+3)-th frame F(i+3), the frame time for which the sub-pixels in the first pixel unit 1001 maintain the first display grayscale H to be unchanged and the frame time for which the sub-pixels in the first pixel unit 1001 maintain the second display grayscale L to be unchanged are four frames. From beginning of the (i+2)-th frame F(i+2) to ending of the (i+5)-th frame F(i+5), the frame time for which the sub-pixels in the second pixel unit 1002 maintain the first display grayscale H to be unchanged and the frame time for which the sub-pixels in the second pixel unit 1002 maintain the second display grayscale L to be unchanged are four frames. Followed by analogy, after the first pixel unit 1001 and the second pixel unit 1002 sequentially perform the display grayscale switching, frames in which the sub-pixels maintain the first display grayscale H and the second display grayscale L to be unchanged are shown in FIG. 2A.

In FIG. 2A, i≥1. Specifically, When i=1, the first pixel unit 1001 performs the display grayscale switching in the first frame F(1), and the second pixel unit 1002 performs the display grayscale switching in the third frame F(3). That is, at this time, the switching frame Fs1 corresponding to the first pixel unit 1001 is F(1), and the switching frame Fs2 corresponding to the second pixel unit 1002 is F(3). A difference Fd between the switching frame Fs2 corresponding to the second pixel unit 1002 and the switching frame Fs1 corresponding to the first pixel unit 1001 is Fs2−Fs1=2. The first pixel unit 1001 and the second pixel unit 1002 perform the display grayscale switching before and after the second frame F(2). Then, the first pixel unit 1001 performs the display grayscale switching in the fifth frame F(5) again, and the second pixel unit 1002 performs the display grayscale switching in the seventh frame F(7) again. That is, at this time, the switching frame Fs1 corresponding to the first pixel unit 1001 is F(5), and the switching frame Fs2 corresponding to the second pixel unit 1002 is F(7). The rest is performed sequentially and cyclically. From beginning of the first frame F(1) to ending of the fourth frame F(4), the frame time for which the sub-pixels in the first pixel unit 1001 maintain the first display grayscale H to be unchanged and the frame time for which the sub-pixels in the first pixel unit 1001 maintain the second display grayscale L to be unchanged is four frames. From beginning of the third frame F(3) to ending of the sixth frame F(6), the frame time for which the sub-pixels in the second pixel unit 1002 maintain the first display grayscale H to be unchanged and the frame time for which the sub-pixels in the first pixel unit 1001 maintain the second display grayscale L to be unchanged are four frames. Followed by analogy, after the first pixel unit 1001 and the second pixel unit 1002 sequentially perform the display grayscale switching, frames in which the sub-pixels maintain the first display grayscale H and the second display grayscale L to be unchanged can be obtained.

In the conventional driving method in which the pixel units 101 perform the display grayscale switching every four frames, the display grayscale switching frequency of the display panel is equal to 30 Hz. In the present disclosure, the pixel units in the pixel unit group 100 are grouped into the first pixel unit 1001 and the second pixel unit 1002, and the difference Fd between the switching frame Fs2 corresponding to the second pixel unit 1002 and the switching frame Fs1 corresponding to the first pixel unit 1001 is 2, the display grayscale switching frequency of the display panel is increased to 60 Hz. Therefore, the flicker problem of the display panel can be improved.

Similarly, when the refresh frequency F0 of the display panel is equal to 240 Hz and the critical flicker frequency CFF is equal to 60 Hz, a difference Fd of the switching frame Fs2 corresponding to the second pixel unit 1002 and the switching frame Fs1 corresponding to the first pixel unit 1001 is smaller than or equal to 4. A frame time Fh of maintaining the first display grayscale H in the sub-pixels 1011 of each of the first pixel unit 1001 and a frame time Fh of maintaining the second display grayscale L in the sub-pixels 1011 of each of the second pixel unit 1002 are equal to N*Fd=2*Fd.

Further, it is assumed that Fd is equal 4 and Fh is equal to 8. That is, the first pixel unit 1001 performs the display gray-scale switching in an i-th frame F(i), and the second pixel unit 1002 performs the display grayscale switching in an (i+4)-th frame F(i+4). That is, the switching frame Fs1 corresponding to the first pixel unit 1001 is F(i), and the switching frame Fs2 corresponding to the second pixel unit 1002 is F(i+4). The first pixel unit 1001 and the second pixel unit 1002 perform the display grayscale switching every other three frames (i.e., perform the display grayscale switching before and after an (i+1)-th frame F(i+1), an (i+2)-th frame F(i+2), and an (i+3)-th frame F(i+3)). Then, the first pixel unit 1001 performs the display grayscale switching again in an (i+8)-th frame F(i+8). A cycle is sequentially performed. In each frame, a number of the sub-pixels 1011 having the first display gray level H in the first pixel unit 1001 is M/2, and a number of the sub-pixels 1011 having the second display gray level L in the first pixel unit 1001 is M/2. In each frame, a number of the sub-pixels 1011 having the first display gray level H in the second pixel unit 1002 is M/2, and a number of the sub-pixels 1011 having the second display gray level L in the second pixel unit 1002 is M/2. From beginning of the i-th frame F(i) to ending of the (i+7)-th frame F(i+7), the frame time for which the sub-pixels in the first pixel unit 1001 maintain the first display grayscale H to be unchanged and the frame time for which the sub-pixels in the first pixel unit 1001 maintain the second display grayscale L to be unchanged are eight frames. From beginning of the (i+4)-th frame F(i+4) to ending of the (i+11)-th frame F(i+11), the frame time for which the sub-pixels in the second pixel unit 1002 maintain the first display grayscale H to be unchanged and the frame time for which the sub-pixels in the second pixel unit 1002 maintain the second display grayscale L to be unchanged are eight frames. Followed by analogy, after the first pixel unit 1001 and the second pixel unit 1002 sequentially perform the display grayscale switching, frames in which the sub-pixels maintain the first display grayscale H and the second display grayscale L to be unchanged are shown in FIG. 2B.

Please continue to refer to FIG. 2C. An example where the display panel includes a pixel unit group 100 and the pixel unit group 100 includes three pixel units 101 (that is, N=3) is used for explaining and describing the driving method of the display panel. Specifically, the pixel unit group 100 includes a first pixel unit 1001, a second pixel unit 1002, and a third pixel unit 1003. The second pixel unit 1002 is located between the first pixel unit 1001 and the third pixel unit 1003. Each of the first pixel unit 1001, the second pixel unit 1002, and the third pixel unit 1003 includes M sub-pixels 1011.

When the refresh frequency F0 of the display panel is equal to 120 Hz and the critical flicker frequency CFF is equal to 60 Hz, the first pixel unit 1001 performs a display grayscale switching in a switching frame Fs1, the second pixel unit 1002 performs a display grayscale switching in a switching frame Fs2, and the third pixel unit 1002 performs a display grayscale switching in a switching frame Fs3. A difference Fd1 of the switching frame Fs2 corresponding to the second pixel unit 1002 and the switching frame Fs1 corresponding to the first pixel unit 1001 is equal to a difference Fd12 of the switching frame Fs3 corresponding to the third pixel unit 1003 and the switching frame Fs2 corresponding to the second pixel unit 1002, that is, Fd1=Fs2-Fs1=Fs3-Fs2=Fd2≤F0/CFF, and Fd=2. A frame time Fh of maintaining the first display grayscale H in the sub-pixels 1011 of each of the first pixel unit 1001, the second pixel unit 1002, and the third pixel unit 1003 and a frame time Fh of maintaining the first display grayscale H in the sub-pixels 1011 of each of the first pixel unit 1001, the second pixel unit 1002, and the third pixel unit 1003 are equal to N*Fd=3*Fd.

Further, it is assumed that Fd is equal 2 and Fh is equal to 6. That is, the first pixel unit 1001 performs the display gray-scale switching in an i-th frame F(i), the second pixel unit 1002 performs the display grayscale switching in an (i+2)-th frame F(i+2), and the third pixel unit 1003 performs the display grayscale switching in an (i+4)-th frame F(i+4). That is, at this time, the switching frame Fs1 corresponding to the first pixel unit 1001 is F(i), the switching frame Fs2 corresponding to the second pixel unit 1002 is F(i+2), and the switching frame Fs3 corresponding to the third pixel unit 1003 is F(i+4). The first pixel unit 1001 and the second pixel unit 1002 perform the display grayscale switching before and after the (i+1)-th frame F(i+1). The second pixel unit 1002 and the third pixel unit 1003 perform the display grayscale switching before and after the (i+3)-th frame F(i+3). Then, the first pixel unit 1001 performs the display grayscale switching again in an (i+6)-th frame F(i+6), the second pixel unit 1002 performs the display grayscale switching in an (i+8)-th frame F(i+8), and the third pixel unit 1003 performs the display grayscale switching in an (i+10)-th frame F(i+10). That is, at this time, the switching frame Fs1 corresponding to the first pixel unit 1001 is F(i+6), the switching frame Fs2 corresponding to the second pixel unit 1002 is F(i+8), and the switching frame Fs3 corresponding to the third pixel unit 1003 is F(i+10). A cycle is sequentially performed. In each frame, a number of the sub-pixels 1011 having the first display gray level H in each of the first pixel unit 1001, the second pixel unit 1002, and the third pixel unit 1003 is M/2, and a number of the sub-pixels 1011 having the second display gray level L in in each of the first pixel unit 1001, the second pixel unit 1002, and the third pixel unit 1003 is M/2. From beginning of the i-th frame F(i) to ending of the (i+5)-th frame F(i+5), the frame time for which the sub-pixels in the first pixel unit 1001 maintain the first display grayscale H to be unchanged and the frame time for which the sub-pixels in the first pixel unit 1001 maintain the second display grayscale L to be unchanged are six frames. From beginning of the (i+2)-th frame F(i+2) to ending of the (i+7)-th frame F(i+7), the frame time for which the sub-pixels in the second pixel unit 1002 maintain the first display grayscale H to be unchanged and the frame time for which the sub-pixels in the second pixel unit 1002 maintain the second display grayscale L to be unchanged are six frames. From beginning of the (i+4)-th frame F(i+4) to ending of the (i+9)-th frame F(i+9), the frame time for which the sub-pixels in the third pixel unit 1003 maintain the first display grayscale H to be unchanged and the frame time for which the sub-pixels in the third pixel unit 1003 maintain the second display grayscale L to be unchanged are six frames. Followed by analogy, after the first pixel unit 1001, the second pixel unit 1002, and the third pixel unit 1003 sequentially perform the display grayscale switching, frames in which the sub-pixels maintain the first display grayscale H and the second display grayscale L to be unchanged are obtained.

The first display gray level H and the second display gray level L can be calculated according to a gamma curve of the display panel from a front viewing angle and a gamma curve from a side viewing angle. When a combination of the first display gray level H and the second display gray level satisfies the gamma curve from the front view angle, it is further necessary to control display effect from the side viewing angle to be close to display effect from the front viewing angle. The arrangement forms of the sub-pixels having the first display grayscale H and the sub-pixels having the second display grayscale L and the numbers of the pixel units shown in FIGS. 2A-2C are only examples but not used to limit the present disclosure. The arrangement forms of the sub-pixels having the first display grayscale H and the sub-pixels having the second display grayscale L in the pixel units 101 in each frame can be implemented based on the existing visual compensation algorithm and are not repeated herein. The arrangement forms of the sub-pixels having the first display grayscale H and the sub-pixels having the second display grayscale L in the pixel units 101 can be different. The first display grayscale H and the second display grayscale L can be calculated according to an original pixel grayscale of the sub-pixel 1011. A grayscale value of the first display grayscale H is greater than a grayscale value of the original pixel grayscale. A grayscale value of the second display grayscale L is smaller than the grayscale value of the original pixel grayscale.

Each of the pixel units 101 can include at least two sub-pixels 1011. One of the two sub-pixels 1011 has the first display grayscale H, and the other of the two sub-pixels 1011 has the second display grayscale L.

When the display panel includes only one pixel unit group 100 and the pixel unit group 100 includes only two pixel units 101, a display area is large when each of the two pixel units 101 performs the display grayscale switching. This is not beneficial for implementing fine control of a display image. Therefore, the display panel can include a plurality of the pixel unit groups 100, and the pixel unit groups 100 include the same number of pixel units 101. When the display grayscale switching is performed, the pixel unit groups 100 respectively include one of the pixel units 101 to perform the display grayscale switching simultaneously to implement the synchronous switching of the pixel unit groups 100. The display area of the display panel is divided into the pixel unit groups 100, so that the display area is smaller when the pixel units 101 in each of the pixel unit groups 100 perform the display grayscale switching. This is beneficial for increasing fineness of a display image.

Optionally, two adjacent pixel unit groups 100 have opposite display grayscale switching sequences. Specifically, referring to FIG. 1, the display panel includes adjacent pixel unit groups **10*a* and 10*b*. The pixel unit groups 10*a* and 10*b* are symmetrically arranged along a symmetry axis 10*c*. The pixel unit 101*a* in the pixel unit group 10*a* and the pixel unit 101*b* in the pixel unit group 10*b* perform the display grayscale switching in the same frame, and the pixel unit 101*c* in the pixel unit group 10*a* and the pixel unit 101*d* in the pixel unit group 10*b*** perform the display grayscale switching in the same frame.

Optionally, the pixel units 101 in two adjacent pixel unit groups 100 of the display panel all have the same display grayscale switching sequence.

Optionally, the display panel further includes a timing controller 103. The timing controller 103 is located in the non-display area **100*b*. The timing controller 103 is electrically connected to the data driving chip 102 to control the data driving chip 102 to generate, according to output signals of the timing controller 103, grayscale voltages which control the sub-pixels 1011** to have the first display grayscale H and the second display grayscale L.

Further, the timing controller 103 includes a lookup unit, a counting unit, and a determining unit. The timing controller 103 obtains the first display grayscale H and the second display grayscale L corresponding to the original pixel grayscale of each of the sub-pixels 1011 by the lookup unit. The timing controller 103 controls, by the counting unit and the determining unit, the pixel units 101 to perform the display grayscale switching and controls the sub-pixels 1011 to have the same frame time Fh of maintaining the first display grayscale H and the second display grayscale L.

Specifically, the counting unit can record data of a current frame. When the current frame is the i-th frame F(i), the counting unit counts i. The determining unit determines, according to the counting unit, whether the pixel units 101 corresponding to the current frame perform the display grayscale switching. A lookup table is stored in the lookup unit. The display panel can look up, according to positions of the first display grayscale H and the second display grayscale L, the lookup table to obtain a value of the first display graysc ale H corresponding to an original pixel grayscale value of each of the sub-pixels corresponding to the position of the first display grayscale H, and to obtain a value of the second display grayscale L corresponding to an original pixel grayscale value of each of the sub-pixels corresponding to the position of the second display grayscale L.

Figure 3:
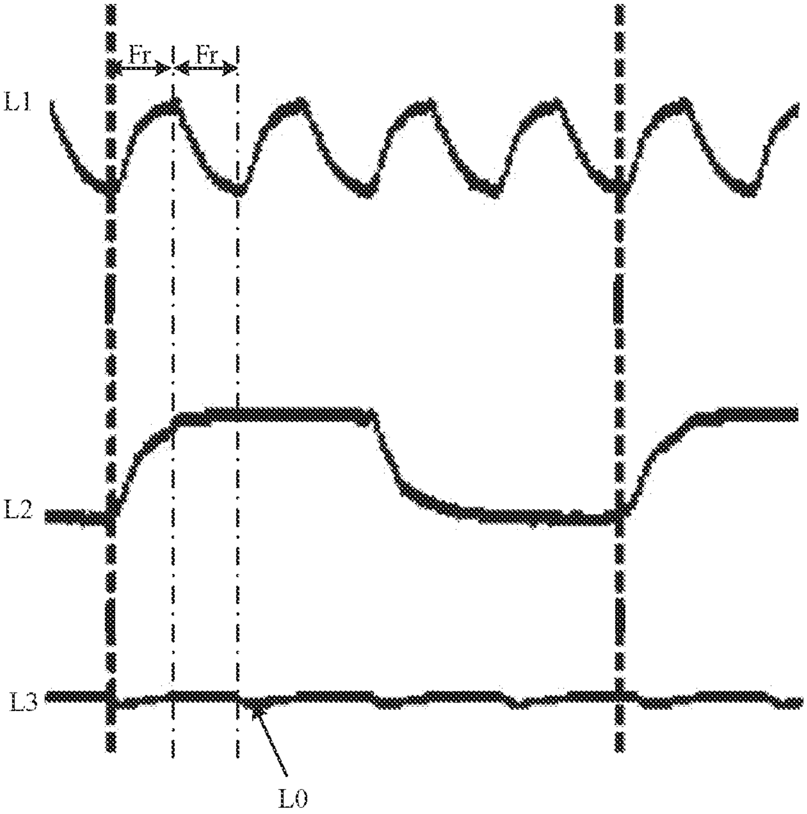
FIG. 3 illustrates an effect test comparison diagram provided by an embodiment of the present disclosure.

FIG. 3 illustrates an effect test diagram provided by an embodiment of the present disclosure. L1 represents a brightness variation test curve obtained by a driving method in which the display grayscale switching is performed once in each frame. L2 represents a brightness variation test curve obtained by a driving method in which the display grayscale switching is performed once every other three frames and a frame time for which the sub-pixels maintain the first display grayscale H and a frame time for which the sub-pixels maintain the second display grayscale L are four frames. L3 represents a brightness variation test curve obtained by a driving method in FIG. 2A in which a refresh frequency F0=8. Fr represents a frame time. It can be seen from FIG. 3 that compared with L1 and L2, a brightness switching frequency is larger and thus a brightness variation range of the brightness variation test curve L3 is smaller in the present disclosure in which the pixel units perform the display grayscale switching in the corresponding switching frames. A large brightness fluctuation of the display panel corresponds to a position where one pixel unit performs the display grayscale switching (that is, corresponding to the position L0 in FIG. 3). In the frames where the sub-pixels in the pixel units maintain the first display grayscale H and the second display grayscale L to be unchanged, the display panel brightness does not fluctuate significantly. Therefore, the obtained brightness variation frequency is reduced to 0.5 of an original refresh frequency F0 of the display panel (that is, the brightness varies only four times in the eight frames.

Figure 4:
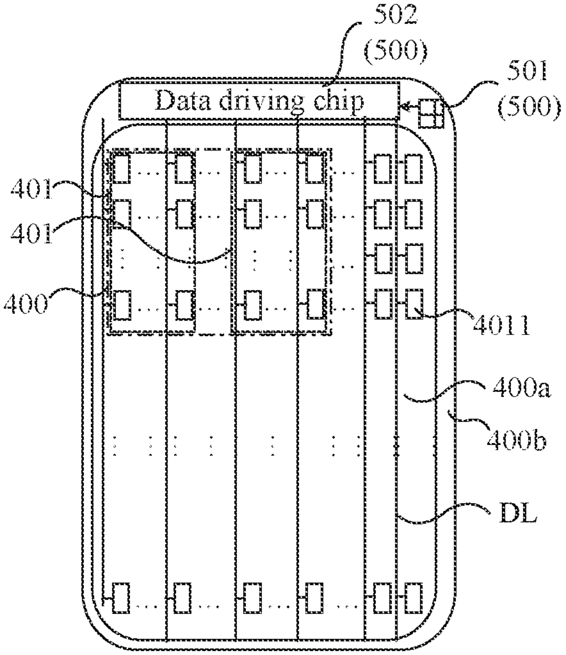
FIG. 4 illustrates a structural diagram of a display panel provided by an embodiment of the present disclosure.

FIG. 4 illustrates a structural diagram of a display panel provided by an embodiment of the present disclosure. The display panel includes a pixel unit group 400 and a control module 500.

The pixel unit group 400 is located in a display area 400*a* of the display panel. The pixel unit group 400 includes a plurality of pixel units 401. The pixel units 401 include the same number of sub-pixels 4011.

The control module 500 is located in a non-display area 400*b* of the display panel. The control module 500 is configured to: obtain, according to input image data, a first display grayscale H and a second display gray level L corresponding to an original pixel grayscale of each of the sub-pixels 4011; perform a display grayscale switching for each of the pixel units 401 in a corresponding switching frame, so that in the corresponding switching frame, the first display grayscale H which the sub-pixels 4011 have is switched to the second display grayscale L and the second display grayscale L which the sub-pixels 4011 have is switched to the first display grayscale H; and control the sub-pixels 4011 in the pixel units 401 to have the same frame time of maintaining the first display grayscale H and the second display grayscale L.

The switching frames corresponding to the pixel units 401 are all different. A number of the sub-pixels having the first display grayscale H in each of the pixel units 401 in the same frame and a number of the sub-pixels having the second display grayscale L are the same. A grayscale value of the first display gray scale H is greater than a grayscale value of an original pixel grayscale. A grayscale value of the second display grayscale L is smaller than the value of the original pixel grayscale.

Further, the control module 500 includes a timing controller 501. The timing controller 501 includes a lookup unit, a counting unit, and a determining unit. The timing controller 501 obtains the first display grayscale H and the second display grayscale L corresponding to the original pixel grayscale of each of the sub-pixels 4011 by the lookup unit. The timing controller 501 controls, by the counting unit and the determining unit, the pixel units 401 to perform the display grayscale switching and controls the sub-pixels 4011 to have the same frame time of maintaining the first display grayscale H and the second display grayscale L.

The control module 500 further includes a data driving chip 502 electrically connected to the timing controller 501. The data driving chip 502 generates, according to output signal of the timing controller 501, grayscale voltages which control the sub-pixels 4011 to have the first display grayscale H and the second display grayscale L.

In order to improve the flicker problem of the display panel, each difference of switching frames corresponding to two adjacent ones of the pixel units 401 is smaller than or equal to a ratio of a refresh frequency of the display panel to a critical flicker frequency.

Further, the differences of switching frames corresponding to any two adjacent ones of the pixel units 401 are the same. A frame time of maintaining the first display grayscale H in the sub-pixels 4011 of each of the pixel units 401 and a frame time of maintaining the second display grayscale L in the sub-pixels 4011 of each of the pixel units 401 are equal to a product of a number of the pixel units 401 included in the pixel unit group 400 and the difference of the switching frames corresponding to two adjacent ones of the pixel units 401.

Specifically, each of the differences of the switching frames corresponding to two adjacent ones of the pixel units 401 is greater than or equal to 1. The frame time for which the sub-pixels 4011 in each of the pixel units 401 maintain the first display grayscale H and the frame time for which the sub-pixels 4011 in each of the pixel units 401 maintain the second display grayscale L are greater than four frames.

Optionally, each of the pixel units 401 includes at least two sub-pixels 4011. One of the two sub-pixels 4011 has the first display gray level H, and the other of the two sub-pixels 4011 has the second display gray level L.

Optionally, the display panel includes a plurality of the pixel unit groups 400. Each of the pixel unit groups 400 includes a plurality of the pixel units 401. Two adjacent ones of the pixel unit groups 400 have the same display grayscale switching sequence. Alternatively, two adjacent ones of the pixel unit groups 400 have opposite display grayscale switching sequences.

Further, the display panel includes a liquid crystal display panel. The display panel includes an array substrate, a color filter substrate, pixel electrodes, a common electrode, and a sealant and liquid crystal molecules located between the array substrate and the color filter substrate. The array substrate includes a plurality of pixel driving circuits. Grayscale voltages are provided for the sub-pixels 1011 via the data driving chip 502 and the pixel driving circuits to implement a display function. Optionally, the pixel electrodes and the common electrode can be both located on the array substrate. Alternatively, the pixel electrodes are located on the array substrate, and the common electrode is located on the color filter substrate. It can be understood that the display panel further includes an alignment layer, a polarizer, a touch electrode, a source driving chip, a sensor and other parts which are not shown.

The present disclosure further provides a display device, which includes a display panel using the above-mentioned driving method of the display panel for display control or any one of the above-mentioned display panels.

Optionally, the display device includes a fixed terminal (a TV, a desktop computers and so on), a mobile terminal (a mobile phone, a laptop and so on), a wearable device (a bracelet, a VR virtual display device, an AR enhanced display device and so on), or a measuring equipment (such as a thermometer).

Specific examples are used in the present disclosure to describe the principle and implementation manners of the present disclosure. The descriptions of the foregoing embodiments are merely intended to help understand the method and core idea of the present disclosure. In addition, those skilled in the art may, according to the idea of the present disclosure, make modifications with respect to the specific implementation manners and the application scope. In summary, the content of the specification shall not be construed as a limitation to the present disclosure.

What is claimed is:

1. A driving method of a display panel, wherein the display panel comprises at least one pixel unit group, the at least one pixel unit group comprises a plurality of pixel units, the pixel units comprise the same number of sub-pixels, the driving method comprises steps of:

performing a display grayscale switching on each of the pixel units in a corresponding switching frame, wherein in the same frame, a number of sub-pixels having a first display grayscale and a number of sub-pixels having a second display grayscale included in each of the pixel units are the same, and a frame time for which the sub-pixels of the pixel units maintain the first grayscale and a frame time for which the sub-pixels of the pixel units maintain the second grayscale are the same; and wherein switching frames corresponding to the pixel units are all different, a value of the first display grayscale is greater than a value of the second display grayscale, and the display gray level switching represents that the first display grayscale which the sub-pixels have is switched to the second display grayscale, and the second display grayscale which the sub-pixels have is switched to the first display grayscale; and wherein each of differences of the switching frames corresponding to any two adjacent ones of the pixel units is smaller than or equal to a ratio of a refresh frequency of the display panel to a critical flicker frequency.

2. The driving method of claim 1, wherein the refresh frequency of the display panel is greater than or equal to 120 Hz.

3. The driving method of claim 2, wherein the at least one pixel unit group comprises two pixel units, an interval between the switching frames of the two pixel units is greater than one frame, and a frame time for which the sub-pixels in each of the pixel units maintain the first display grayscale and a frame time for which the sub-pixels in each of the pixel units maintain the second display grayscale are greater than four frames.

4. A display panel, wherein the display panel comprises:

at least one pixel unit group, the at least one pixel unit group comprising a plurality of pixel units, the pixel units comprising the same number of sub-pixels; and a control module configured to: obtain, according to input image data, a first display grayscale and a second display gray level corresponding to an original pixel grayscale of each of the sub-pixels; perform a display grayscale switching for each of the pixel units in a corresponding switching frame, so that in the corresponding switching frame, the first display grayscale which the sub-pixels have is switched to the second display grayscale and the second display grayscale which the sub-pixels have is switched to the first display grayscale; and to control the sub-pixels in the pixel units to have the same frame time of maintaining the first display grayscale and the second display grayscale; and wherein switching frames corresponding to the pixel units are all different, a value of the first display grayscale is greater than a value of the second display grayscale, and the display gray level switching represents that the first display grayscale which the sub-pixels have is switched to the second display grayscale, and the second display grayscale which the sub-pixels have is switched to the first display grayscale; and wherein each of differences of the switching frames corresponding to any two adjacent ones of the pixel units is smaller than or equal to a ratio of a refresh frequency of the display panel to a critical flicker frequency.

5. The display panel of claim 4, wherein the control module comprises a timing controller, and the timing controller comprises a lookup unit, a counting unit, and a determining unit;

the timing controller obtains the first display grayscale and the second display grayscale corresponding to the original pixel grayscale of each of the sub-pixels by the lookup unit; and the timing controller controls, by the counting unit and the determining unit, the pixel units to perform the display grayscale switching and controls the sub-pixels to have the same frame time of maintaining the first display grayscale and the second display grayscale.

6. The display panel of claim 5, wherein the control module further comprises a data driving chip electrically connected to the timing controller, the data driving chip generates, according to output signal of the timing controller, grayscale voltages which control the sub-pixels to have the first display grayscale and the second display grayscale.

7. The display panel of claim 4, wherein differences of the switching frames corresponding to any two adjacent ones of the pixel units are the same, and a frame time of maintaining the first display grayscale in the sub-pixels of each of the pixel units and a frame time of maintaining the second display grayscale in the sub-pixels of each of the pixel units are equal to a product of the difference of the switching frames corresponding to the two adjacent ones of the pixel units and a number of the pixel units included in the at least one pixel unit group.

8. The display panel of claim 7, wherein each of the differences of the switching frames corresponding to two adjacent ones of the pixel units is greater than or equal to 1, the frame time for which the sub-pixels in each of the pixel units maintain the first display grayscale and the frame time for which the sub-pixels in each of the pixel units maintain the second display grayscale are greater than four frames.

9. The display panel of claim 4, wherein each of the pixel units comprises at least two sub-pixels, one of the two sub-pixels has the first display gray level, and the other of the two sub-pixels has the second display gray level.

10. A display device, wherein the display device comprises a display panel, and the display panel comprises:

at least one pixel unit group, the at least one pixel unit group comprising a plurality of pixel units, the pixel units comprising the same number of sub-pixels; and a control module configured to: obtain, according to input image data, a first display grayscale and a second display gray level corresponding to an original pixel grayscale of each of the sub-pixels; perform a display grayscale switching for each of the pixel units in a corresponding switching frame, so that in the corresponding switching frame, the first display grayscale which the sub-pixels have is switched to the second display grayscale and the second display grayscale which the sub-pixels have is switched to the first display grayscale; and to control the sub-pixels in the pixel units to have the same frame time of maintaining the first display grayscale and the second display grayscale; and wherein switching frames corresponding to the pixel units are all different, a value of the first display grayscale is greater than a value of the second display grayscale, and the display gray level switching represents that the first display grayscale which the sub-pixels have is switched to the second display grayscale, and the second display grayscale which the sub-pixels have is switched to the first display grayscale; and wherein each of differences of the switching frames corresponding to any two adjacent ones of the pixel units is smaller than or equal to a ratio of a refresh frequency of the display panel to a critical flicker frequency.

11. The display device of claim 10, wherein the control module comprises a timing controller, and the timing controller comprises a lookup unit, a counting unit, and a determining unit;

the timing controller obtains the first display grayscale and the second display grayscale corresponding to the original pixel grayscale of each of the sub-pixels by the lookup unit; and the timing controller controls, by the counting unit and the determining unit, the pixel units to perform the display grayscale switching and controls the sub-pixels to have the same frame time of maintaining the first display grayscale and the second display grayscale.

12. The display device of claim 11, wherein the control module further comprises a data driving chip electrically connected to the timing controller, and the data driving chip generates, according to output signal of the timing controller, grayscale voltages which control the sub-pixels to have the first display grayscale and the second display grayscale.

13. The display device of claim 10, wherein differences of the switching frames corresponding to any two adjacent ones of the pixel units are the same, and a frame time of maintaining the first display grayscale in the sub-pixels of each of the pixel units and a frame time of maintaining the second display grayscale in the sub-pixels of each of the pixel units are equal to a product of the difference of the switching frames corresponding to the two adjacent ones of the pixel units and a number of the pixel units included in the at least one pixel unit group.

14. The display device of claim 13, wherein each of the differences of the switching frames corresponding to two adjacent ones of the pixel units is greater than or equal to 1, the frame time for which the sub-pixels in each of the pixel units maintain the first display grayscale and the frame time for which the sub-pixels in each of the pixel units maintain the second display grayscale are greater than four frames.

15. The display device of claim 10, wherein each of the pixel units comprises at least two sub-pixels, one of the two sub-pixels has the first display gray level, and the other of the two sub-pixels has the second display gray level.

* * * * *